United States Patent
Zhou et al.

(10) Patent No.: US 11,645,509 B2
(45) Date of Patent: May 9, 2023

(54) CONTINUAL NEURAL NETWORK LEARNING VIA EXPLICIT STRUCTURE LEARNING

(71) Applicant: salesforce.com, inc., San Francisco, CA (US)

(72) Inventors: Yingbo Zhou, San Francisco, CA (US); Xilai Li, San Francisco, CA (US); Caiming Xiong, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 902 days.

(21) Appl. No.: 16/176,419

(22) Filed: Oct. 31, 2018

(65) Prior Publication Data
US 2020/0104699 A1    Apr. 2, 2020

Related U.S. Application Data

(60) Provisional application No. 62/737,636, filed on Sep. 27, 2018.

(51) Int. Cl.
*G06N 3/08*    (2006.01)
*G06N 3/04*    (2006.01)

(52) U.S. Cl.
CPC ............... *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS 10,282,663 B2    5/2019    Socher et al.
10,346,721 B2    7/2019    Albright et al.
(Continued)

FOREIGN PATENT DOCUMENTS

JP    2017211799 A    11/2017
KR    20180089132 A    8/2018
WO    2018017546 A1    1/2018

OTHER PUBLICATIONS

Lee et al., "Overcoming Catastrophic Forgetting by Incremental Moment Matching", Neural Information Processing Systems (NIPS) Conference, 2017 (Year: 2017).*
(Continued)

*Primary Examiner* — Omar F Fernandez Rivas
*Assistant Examiner* — Selene A. Haedi
(74) *Attorney, Agent, or Firm* — Haynes and Boone, LLP

(57) ABSTRACT

Embodiments for training a neural network using sequential tasks are provided. A plurality of sequential tasks are received. For each task in the plurality of tasks a copy of the neural network that includes a plurality of layers is generated. From the copy of the neural network a task specific neural network is generated by performing an architectural search on the plurality of layers in the copy of the neural network. The architectural search identifies a plurality of candidate choices in the layers of the task specific neural network. Parameters in the task specific neural network that correspond to the plurality of candidate choices and that maximize architectural weights at each layer are identified. The parameters are retrained and merged with the neural network. The neural network trained on the plurality of sequential tasks is a trained neural network.

20 Claims, 4 Drawing Sheets

(56) References Cited

U.S. PATENT DOCUMENTS

| | | | |
|---|---|---|---|
| 10,474,709 | B2 | 11/2019 | Paulus |
| 2016/0092765 | A1* | 3/2016 | Chilimbi ............... G06N 3/084 706/25 |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher |
| 2017/0262737 | A1* | 9/2017 | Rabinovich .......... G06K 9/6267 |
| 2017/0337464 | A1* | 11/2017 | Rabinowitz .......... G06N 3/0454 |
| 2018/0082171 | A1 | 3/2018 | Merity et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0336198 | A1 | 11/2018 | Zhong et al. |
| 2018/0336453 | A1 | 11/2018 | Merity et al. |
| 2018/0349359 | A1 | 12/2018 | McCann et al. |
| 2018/0373682 | A1 | 12/2018 | McCann et al. |
| 2018/0373987 | A1 | 12/2018 | Zhang et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0188568 | A1 | 6/2019 | Keskar et al. |
| 2019/0236482 | A1* | 8/2019 | Desjardins ............... G06N 3/08 |
| 2019/0251168 | A1 | 8/2019 | McCann et al. |
| 2019/0251431 | A1 | 8/2019 | Keskar et al. |
| 2019/0251439 | A1* | 8/2019 | Zoph .................... G06N 3/0454 |
| 2019/0258714 | A1 | 8/2019 | Zhong et al. |
| 2019/0258901 | A1 | 8/2019 | Albright et al. |
| 2019/0258939 | A1 | 8/2019 | Min et al. |
| 2019/0286073 | A1 | 9/2019 | Hosseini-Asl et al. |
| 2019/0295530 | A1 | 9/2019 | Hosseini-Asl et al. |
| 2019/0354868 | A1* | 11/2019 | Wierstra ............... G06N 3/0454 |
| 2019/0362020 | A1 | 11/2019 | Paulus et al. |
| 2019/0362246 | A1 | 11/2019 | Lin et al. |

OTHER PUBLICATIONS

Coop et al., "Ensemble Learning in Fixed Expansion Layer Networks for Mitigating Catastrophic Forgetting", IEEE Transactions on Neural Networks and Learning Systems, vol. 24, No. 10, Oct. 2013 (Year: 2013).*

Moody, "Prediction Risk and Architecture Selection for Neural Networks", 1994 (Year: 1994).*

Bender et al. "Understanding and Simplifying One-Shot Architecture Search", Jul. 2018 (Year: 2018).*

Liu et al., "Recurrent Neural Network for Text Classification with Multi-Task Learning", 2016 (Year: 2016).*

Zhou et al. "Resource-Efficient Neural Architect", Jun. 2018 (Year: 2018).*

Baker et al., "Accelerating neural architecture search using performance prediction." arXiv preprint arXiv: 1705.10823, Nov. 8, 2017, 14 pages.

Fernando et al., "Pathnet: Evolution channels gradient descent in super neural networks," arXiv preprint arXiv:1701.08734, Jan. 30, 2017, 16 pages.

He et al., "Deep residual learning for image recognition," in Proceedings of the IEEE Conference on Computer Vision and Pattern Recognition, Las Vegas, NV, USA, Jun. 26-Jul. 1, 2016, pp. 770-778.

Kirkpatrick et al., "Overcoming Catastrophic Forgetting in Neural Networks," Proceedings of the National Academy of Sciences, Mar. 28, 2017, pp. 3521-3526.

Lee et al., "Lifelong Learning with Dynamically Expandable Networks," arXiv preprint arXiv:1 708.01547, Aug. 4, 2017, 9 pages.

Li et al., "Supportnet: Solving Catastrophic Forgetting in Class Incremental Learning with Support Data," arXiv preprint arXiv/1806.02942, Sep. 1, 2018, 9 pages.

Liu, et al., "Darts: Differentiable Architecture Search," ArXiv preprint arXiv:1806.09055, Jun. 24, 2018, 12 pages.

Lopez-Paz et al., "Gradient Episodic Memory for Continual Learning," in 31st Conference on Neural Information Processing Systems, Long beach, CA, USA, Dec. 4-9, 2017, 10 pages.

Mallya et al., "Piggyback: Adding Multiple Tasks to a Single, Fixed Network by Learning to Mask," arXiv preprint 1801.06519, Mar. 16, 2018, 16 pages.

Mancini et al., "Adding New Tasks to A Single Network with Weight Transformations Using Binary Masks," arXiv:1805.11119, Jun. 14, 2018, 17 pages.

McCloskey et al., "Catastrophic Interference in Connectionist Networks: The Sequential Learning Problem," in Psychology of learning and motivation, vol. 24. 1989, pp. 109-165.

Ratcliff et al., "Connectionist Models of Recognition Memory: Constraints Imposed By Learning And Forgetting Functions," Psychological review, vol. 97, No. 2. 1990, pp. 285-308.

Rebuffi et al., "Learning multiple visual domains with residual adapters," in 31st Conference on Neural Information Processing Systems, Long beach, CA, USA, Dec. 4-9, 2017, 11 pages.

Rebuffi et al., "iCaRL: Incremental Classifier and Representation Learning," in Proceedings of the IEEE Conference on Computer Vision and Pattern Recognition, Honolulu, Hawaii, USA, Jul. 21-26, 2017, pp. 2001-2010.

Rebuffi et al., "Efficient parametrization of multi-domain deep neural networks," in Proceedings of the IEEE Conference on Computer Vision and Pattern Recognition, Salt Lake City, Utah, USA, Jun. 18-22, 2018. pp. 8119-8127.

Robins, Anthony, "Catastrophic Forgetting. Rehearsal and Pseudorehearsal," Connection Science, 7(2): 123-146. 1995, 37 pages.

Rusu et al., "Progressive Neural Networks," arXiv preprint arXiv: 1606.04671, Sep. 7, 2016, 14 pages.

Sener et al., "Active Learning for Convolutional Neural Networks: A Core-Set Approach," International Conference on Learning Representations, New Orleans, Louisiana, May 6-9, 2018, 13 pages.

Stanley et al., "Evolving Neural Networks Through Augmenting Topologies," Evolutionary computation. 10(2) Massachusetts Institute of Technology, 2002, pp. 99-127.

Thrun et al., "Lifelong robot learning," in The biology and technology of intelligent autonomous agents, Springer, 1995, pp. 165-196.

Zenke et al., "Continual Learning Through Synaptic Intelligence," arXiv: 1703.04200,Jun. 12, 2017,10 pages.

Zoph et al., "Neural Architecture Search with Reinforcement Learning," arXiv:161 J.01578, Nov. 5, 2016, 15 pages.

Cortes et al., "The mnist database of handwritten digits," 1998.

International Search Report and Written Opinion from PCT/US2019/053028, dated Jan. 20, 2020, pp. 1-11.

Shirakawa et al., "Dynamic Optimization of Neural Network Structures using Probabilistic Modeling," Thirty-Second AAAI Conference on Artificial Intelligence (AAAI-18) arXiv:1801.07650v1, dated Jan. 23, 2018, pp. 1-9.

International Preliminary Report on Patentability received for PCT Patent Application No. PCT/US19/53028, dated Apr. 8, 2021, 8 pages.

* cited by examiner

CONTINUAL NEURAL NETWORK LEARNING VIA EXPLICIT STRUCTURE LEARNING

PRIORITY APPLICATION DATA

This application claims priority to U.S. Provisional Patent Application No. 62/737,636 filed on Sep. 27, 2018, which is incorporated by reference in its entirety.

TECHNICAL FIELD

The disclosure generally relates to training a neural network and more specifically to improving the neural network to process multiple tasks without catastrophic forgetting.

BACKGROUND

Conventional deep learning neural networks are designed to process a single task and are trained on a large dataset that corresponds to the task. In this case, all training samples may be drawn from the same domain. However, many real-world applications, such as applications in robotics, machine vision, etc., may have multiple tasks and have training samples from different domains. In this case, multiple tasks may be performed using multiple neural networks, where each network is designated to process a particular task. However, storing multiple neural networks in resource-constrained platforms, such as mobile device platforms, may be impractical. Further, if multiple neural networks are implemented in hardware, mobile device platforms may become heavy and/or bulky with the additional hardware. This is particularly true when a number of tasks increase over time.

Accordingly, there is a need to train a neural network to process multiple tasks. However, training a neural network on a new task by directly modifying the weights or parameters of the neural nodes, may lead to deterioration in the neural network performance when the neural network processes previous tasks. This is because the neural network may forget how to process previous tasks, also known as "catastrophic forgetting."

Accordingly, there is a need for developing a training model for a neural network that trains the neural network to process multiple tasks while reducing "catastrophic forgetting."

In the figures, elements having the same designations have the same or similar functions.

DETAILED DESCRIPTION

Common approaches to overcoming catastrophic forgetting in a neural network are elastic weight consolidation ("EWC") and learning without forgetting ("LwF"). The EWC approach is discussed in "Overcoming Catastrophic Forgetting in Neural Networks" and the LwF approach is discussed in "Solving Catastrophic Forgetting in Class Incremental Learning with Support Data," both of which are incorporated herein by reference. These approaches focus on alleviating catastrophic forgetting by applying constraints on updating the neural network weights. However, while applying constrains may reduce catastrophic forgetting, catastrophic forgetting still exists when using the EWC and LwF approaches. Another common approach to catastrophic forgetting includes memory-based methods that store some key data points for every task and jointly train with the current task data. Yet another approach, such as "piggyback" or "residual adapter" approach, includes learning multiple visual domains and avoiding the catastrophic forgetting in these domains by adding a small portion of parameters while keeping the original weights fixed. These approaches, however, rely on a strong base neural network and knowledge that can only be transferred from one task to another.

The embodiments below describe a training module that uses a novel approach for training a neural network to perform multiple tasks. The training module employs an architectural search for each of the sequential tasks which identifies an optimal neural network structure for the current task in the sequential tasks. In identifying an optimal neural network structure, the training module may determine whether the neural network may share each layer's parameters (also referred to as weights) with the current task, adapt weights to the existing parameters, spawn new parameters for the current task, etc. Once the training module determines the parameters in the neural network architecture for the current ask, the training module may then train the parameters using the current task.

Figure 1:
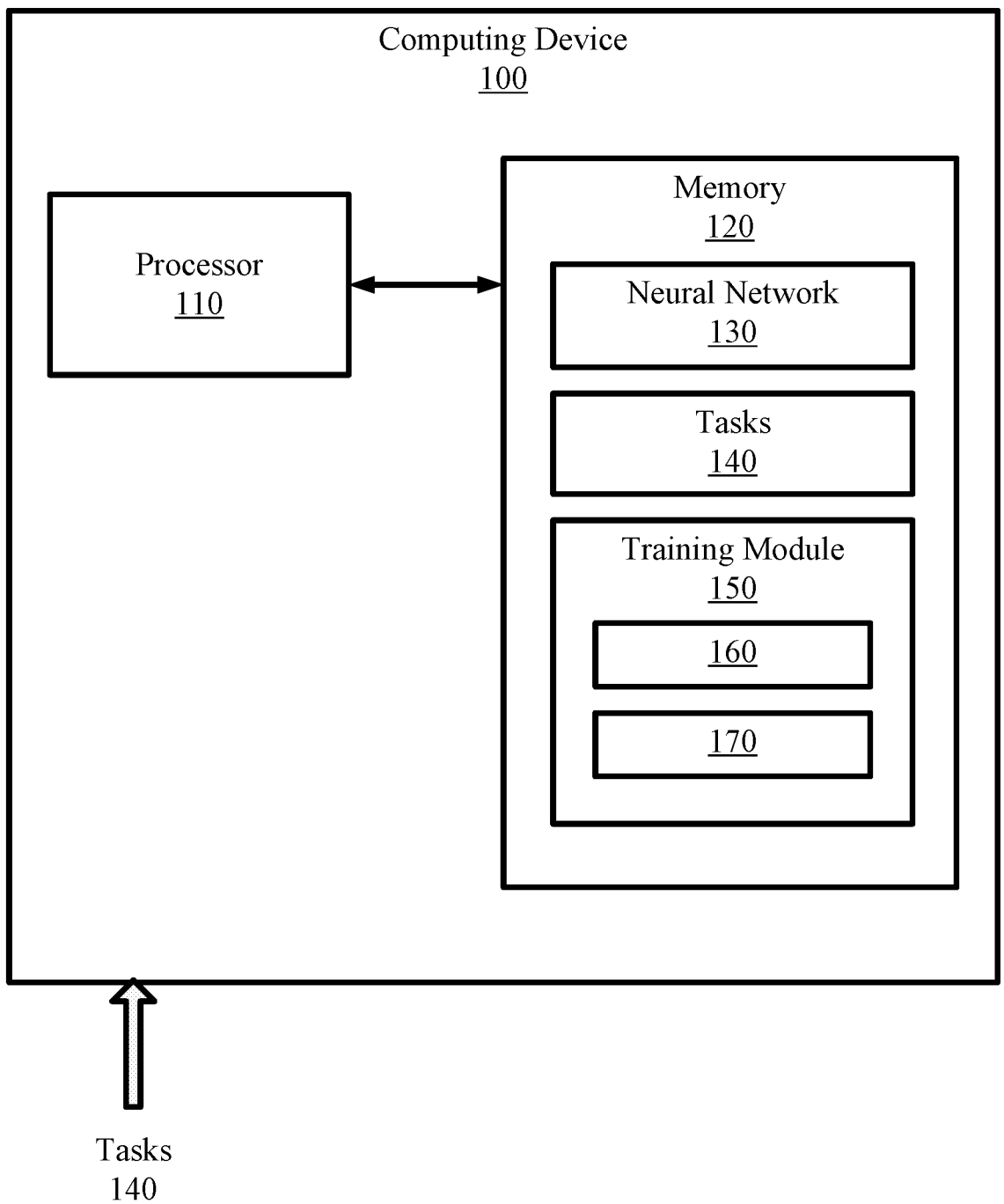
FIG. 1 is a simplified diagram of a computing device, according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities. In some examples, memory 120 may include non-transitory, tangible, machine readable media that includes executable code that when run by one or more processors (e.g., processor 110) may cause the one or more processors to perform the training methods described in further detail herein.

As illustrated in FIG. 1, memory 120 may include a neural network 130. Neural network 130 may be implemented using hardware, software, and/or a combination of hardware and software. Neural network 130 typically includes one or more interconnected layers with each layer having one or more nodes. The nodes at each layer typically include one or more parameters (also referred to as weights), that may manipulate the data received at the node before passing the data to one or more nodes at the next layer in the neural network.

In some embodiments, neural network 130 may generate a result when data from a data set is passed through neural network 130. For example, neural network 130 may recognize an object in an image from the data submitted as input to neural network 130. In another example, neural network 130 may determine a word or words based on data that includes a sequence of sounds submitted as input.

Prior to neural network 130 generating an expected result, neural network 130 may be trained. During training, one or more known datasets are passed through the layers of neural network 130 to generate an output. The weights of individual nodes in neural network 130 may be modified until the output of neural network 130 converges toward the expected output.

In some embodiments, memory 120 may include a training module 150. Unlike a conventional training module, training module 150 may train neural network 130 to process multiple tasks, such as tasks 140, while minimizing catastrophic forgetting. In some embodiments, training module 150 may learn each task in tasks 140 sequentially and using a two-step process on each task. To learn each task, training module may include a structure optimizer 160 and parameter optimizer 170. Structure optimizer 160 may perform an architecture search step of the two-step process and may identify an optimal choice for a parameter or weight in each layer of neural network 130. The parameter or weight in the optimal choice minimizes the loss function, described below. An example choice may be to share or reuse a parameter in neural network 130. The existing parameter may have been determined while neural network 130 has been trained on one or more previous tasks in tasks 140. Another choice may be to skip a layer in neural network 130. Yet another choice may be to add a small amount to the existing parameter or determine a new parameter from scratch to process the task. In some embodiments, the loss function may be a multi-objective loss function that includes the normal learning loss (e.g. cross-entropy loss for classification) and budget control loss (penalize the choices that add a larger parameter size), etc. Once the architecture search step completes for each task, the two-step process proceeds to a parameter optimization step where parameter optimizer 170 may retrain neural network 130 on the task.

Figure 2:
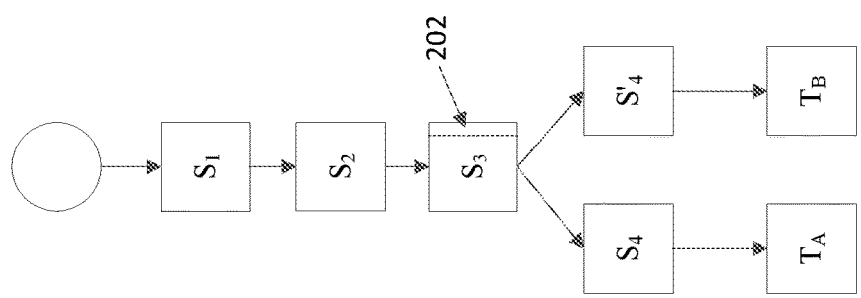
FIG. 2 is a block diagram of an architectural search, according to some embodiments.

FIG. 2 is a block diagram of a neural network 200 undergoing an architectural search, according to some embodiments. Neural network 200, which may be consistent with neural network 130 of FIG. 1, may process two tasks, task A ($T_A$) and task B ($T_B$) as tasks 140. In the embodiment in FIG. 2, training module 150 may be training neural network 200 to process task B, and as part of the training add an adaptation to a parameter that adds a small amount of data, reuse a parameter or generate a new parameter, as will be discussed below.

For example, neural network 200 in FIG. 2 includes five layers, where the first layer includes parameter $S_1$, the second layer includes parameter $S_2$, the third layer includes parameter $S_3$, the fourth layer includes parameter $S_4$ and $S'_4$ and the fifth layer includes task specific layers, such as layer $T_A$ for task A and layer $T_B$ for task B.

In the architectural search illustrated in FIG. 2, training module 150 may have already trained neural network 200 on task A and is training neural network 200 on task B. As illustrated in FIG. 2, training module 150 may determine that parameters $S_1$ and $S_2$ that were generated while training task A may also be re-used for tasks B. As also illustrated in FIG. 2, training module 150 may determine that parameter $S_3$ may include an adaptation 202 that is associated with task B, and add a new parameter $S'_4$ to layer four that may be used to process task B. As also illustrated in FIG. 2, layer $T_A$ is a layer in neural network 200 that is specific to processing task A, and layer $T_B$ is a layer in neural network 200 that is specific to processing task B.

Going back to FIG. 1, in some embodiments, neural network 130 may be trained using multiple tasks 140. Tasks 140 may be modeled as a test sequence designated as T=($T_1$, $T_2$, ..., $T_N$), where N is a number of tasks in tasks 140. Each task $T_i$ in T may be composed of dataset $$D_i = \{(x_1^{(i)}, y_1^{(i)}), (x_2^{(i)}, y_2^{(i)}), \ldots, (x_{N_{T_i}}^{(i)}, y_{N_{T_i}}^{(i)})\},$$

where each dataset $D_i$ may be of size $N_{T_i}$. In some embodiments, training module 150 may train neural network 130 to observe tasks from 1 to N sequentially. This means that after neural network 130 has finished learning or training on task $T_i$, neural network 130 may no longer access task $T_i$. Accordingly, the data from dataset $D_i$ that training module 150 used to train neural network 130 on task $T_i$ may not be available when learning tasks $T_{i+1}$ to $T_N$. Further, even though training module 140 may train tasks 140 sequentially, the actual order of tasks 140 in the sequence may be random.

In some embodiments, while training neural network 130, training module 150 may minimize the loss function in a continuous learning setting. Example loss function L for neural network 130 may be:

$$L(\theta) = \sum_{i=1}^{N} L_i(\theta) \quad \text{(Equation 1)}$$

$$L_i(\theta) = \frac{1}{N_{T_i}} \sum_{n=1}^{N_{T_i}} l_i(f_\theta(x_n^{(i)}), y_n^{(i)}) \quad \text{(Equation 2)}$$

where $f_\theta$ is the model and $l_i$ is the loss function for task $T_i$ that neural network 130 is trained to process. In some embodiments, because training module 150 may not have access to an entire dataset at the same time, loss function $L(\theta)$ of Equation 1 may be difficult to minimize. However, if training module 150 ignores the data access issue while training neural network 130 on each task $T_i$, the training may lead to catastrophic forgetting. In some embodiments, the loss function $L(\theta)$ of Equation 1 may also fail to account for structural changes made to neural network 130.

In some embodiments, while learning a structure of neural network 130 for new tasks that are highly dissimilar from the current and previously seen tasks in tasks 140, optimizing the neural network parameters conventionally may cause forgetting. This is because neural network 130 may function differently between new tasks and previously seen tasks in tasks 140, and it is unlikely that optimal parameters generated for a new task may also be a good solution for the previous tasks. In some embodiments where the new and previous tasks in tasks 140 are similar, it also may not be ideal to share the complete structure of neural network 130 to process the new and previous tasks. This is because there might be fine grained details among similar tasks in tasks 140 that make a part of neural network 130 focus on extracting different types of representations. To alleviate the deficiencies above, training module 150 may include a $s_i(\theta)$ that indicates the structure for task $T_i$ in the loss function $L(\theta)$. In this case, the loss function for individual task $T_i$ may be:

$$L_i(\theta) = \frac{1}{N_{T_i}} \sum_{n=1}^{N_{T_i}} l_i(f_{s_i\theta}(x_n^{(i)}), y_n^{(i)}) \quad \text{(Equation 3)}$$

In this way, the structure $s_i(\theta)$ of each individual task $T_i$ may explicitly be taken into consideration when training module 150 may train neural network 130 using tasks 140.

In some embodiments, when optimizing the updated loss function $L_i(\theta)$ in Equation 3, training module 150 may determine the optimal parameter based on the structure $s_i$. In some embodiments, training module 150 may interpret the loss as selecting a task specific network from a super network, such as neural network 130, that has parameter $\theta$ using $s_i$. In this case, there is a constraint on a total size of neural network 130. In other embodiments, for each task $T_i$ in tasks 140 that training module 150 may train neural network 130 with parameter $s_i(\theta)$. In this case, the total size of neural network 130 may increase as a number of tasks 140 increases because the total size of neural network 130 would be the total size of neural network models for tasks 140.

In some embodiments, the loss function may also be defined as follows:

$$L_i(\theta) = \frac{1}{N_{T_i}} \sum_{n=1}^{N_{T_i}} l_i(f_{s_i\theta}(x_n^{(i)}), y_n^{(i)}) + \beta_i R_i^s(s_i) + \lambda_i R_i^p(\theta) \quad \text{(Equation 4)}$$

where $\beta_i > 0$, $\lambda_i \geq 0$, $R_i^s$ and $R_i^p$ indicate regularizers for structure and parameter, respectively. Regularizers may be terms that are added to the loss function that cause optimal parameters for task $T_i$ to remain close, that is within configurable range to optimal parameters of previous tasks. Regularizers are further discussed in "Overcoming catastrophic forgetting in neural networks," which is incorporated herein by reference. In this way, training module 140 may set an upper bound to the total number of parameters and may avoid a scenario where the size of neural network 130 increases proportionally with the increase in the number of tasks 140.

In some embodiments, training module 150 may optimize the loss function $L_i(\theta)$ in Equation 4 using a two-step process. The first step in a two-step process may include structure optimization, and the second step may include parameter learning. As will be discussed below, structure optimizer 160 may perform an architectural search on neural network 130 for each task $T_i$ in tasks 140 that identifies optimal parameters for each task $T_i$ and parameter optimizer 170 may train the optimal parameters in neural network 130 to process task $T_i$.

As discussed above, structure optimizer 160 may perform an architecture search of neural network 130 that optimizes the structure of neural network 130. During training, neural network 130 may be referred to as super network S. Additionally, neural network 130 may be trained to include L shareable layers that may be shared by tasks 140 and one task-specific layer that is specific for each task $T_i$ in tasks 140. In some embodiments, the task specific layer may be the last layer in neural network 130.

In some embodiments, structure optimizer 160 may maintain super network S so that the new task-specific layers and new shareable layers may be stored in super network S once structure optimizer 160 completes optimizing task $T_i$.

In some embodiments, the parameters or weights in super network S may be initialized with predetermined values or may be initialized with random values.

In some embodiments, structure optimizer 160 may search for a task specific neural network for each individual task $T_i$. To search for the task specific neural network, structure optimizer 160 may make a copy of super network S. Structure optimizer 160 may then generate a task specific neural network from a copy of the super network S for task $T_i$ by identifying an optimal choice for each of the shareable layers in the copy of the super network given new task dataset $D_i$ and the weights of the parameters in shareable layers stored in the super network S. In some embodiments, structure optimizer 160 may select among the "reuse", "adaptation," and "new" choices to optimize the task specific neural network. The "reuse" choice may occur when structure optimizer 160 may reuse the same parameters in the task specific neural network for the new task as for a previous task. In other words, structure optimizer 160 may use parameters in the task specific neural network that were included in the super network S from previous tasks. The "adaptation" choice may occur when structure optimizer 160 adds a small parameter overhead that trains an additive function to the original layer output. In other words, the "adaptation" choice may add an additive function to one of the parameters that were previously stored in super network S. The "new" choice may cause structure optimizer 160 to spawn one or more new parameters that do not exist in super network S. In some embodiments, structure optimizer 160 may spawn the one or more new parameters in a current layer with the same size as the parameters that already exist in current layer.

In some embodiments, the size of the $l_{th}$ layer in super network S may be denoted as $|S^l|$. Accordingly, the total number of choices in the $l_{th}$ layer $C_l$ is $2|S^l|+1$, because structure optimizer 160 may include $|S^l|$ "reuse" choices, $|S^l|$ "adaptation" choices and generate one "new" choice. Thus, the total search space may be $\Pi_l^L C_l$.

In some embodiments, to prevent the search space from growing exponentially with respect to a number of tasks 140, structure optimizer 160 may limit the total number of possible choices and make a priority queue for managing different choices.

In some embodiments, structure optimizer 160 may make the search space continuous. To make the search space continuous, structure optimizer 160 may relax the categorical choice of the $l_{th}$ layer as a softmax over all possible $C_l$ choices according to Equation 5:

$$x_{l+1} = \sum_{c=1}^{C_l} \frac{\exp(\alpha_c^l)}{\sum_{c'=1}^{C_l} \exp(\alpha_{c'}^l)} g_c^l(x_l) \quad \text{(Equation 5)}$$

where the vector $\alpha^l$ of dimension $C_l$ may be the architecture weights that may be used for mixing the choices for each shareable layer, and $g_c^l$ may be an operator for the choice c at layer l which may be expressed according to Equation 6 as:

$$g_c^l(x_l) = \begin{cases} S_c^l & \text{if } c \leq |S^l| \\ S_c^l(x_l) + \gamma_{c-|S^l|}^l(x_l) & \text{if } |S^l| < c < 2|S^l| \\ o^l(x_l) & \text{if } c = 2|S^l| + 1 \end{cases} \quad \text{(Equation 6)}$$

where $\gamma$ is the adapter operator and o is the new operator trained from scratch. In some embodiments, after the above relaxation, the task of discrete search becomes optimizing a set of continuous weights $\alpha = \{\alpha^l\}$. In some embodiments, after structure optimizer 160 may complete the architectural search, structure optimizer 160 may determine an optimal structure by taking the index with the largest weight $\alpha_c^l$ for each layer l, i.e. $c_l = \arg \max \alpha^l$.

In some embodiments, structure optimizer 160 may use the validation loss $L_{val}$ to update the architecture weights $\alpha$, and optimize the operator weights by the training loss $L_{train}$. In some embodiments, structure optimizer 160 may update the architecture weights and the operator weights alternatively during the architectural search process. In some embodiments, structure optimizer 160 any use a first order approximation or a second order approximation process to update the architecture weights and/or the operator weights.

The example below describes how structure optimizer 160 may use the "reuse", "adaptation" and "new" choices. Suppose the task specific neural network associated with an individual task $T_i$ is a convolutional neural network where all layers have a 3×3 kernel size. When structure optimizer 160 selects a "reuse" choice, the existing weights in the shareable layers are reused and are kept fixed during the training process. When structure optimizer 160 selects an "adaptation" choice, structure optimizer 160 may, for example, add a 1×1 convolutional layer in parallel with the original 3×3 convolutional layer. In this case, during training (described below), parameter optimizer 170 may fix the parameters of the 3×3 convolutional kernel, but the parameters of the 1×1 convolutional layer may be modified. In this case, the cost of adding an additional parameter may be ⅑ of the original parameter size. When structure optimizer 160 selects a "new" choice, structure optimizer 160 may add a new parameter that may be initialized and trained from scratch. In some embodiments, structure optimizer 160 may use the loss function $L_{val}$ to implement the regularizer for the structure $R_i^s(s_i)$. In some embodiments, the value of the loss function may be set as being proportional to the product of the additional parameter size $z_c^l$ and its corresponding weight $\alpha_c^l$. In some embodiments, structure optimizer 160 may optimize the architectural weights $\alpha$ in terms of accuracy and parameter efficiency at the same or approximately the same time.

Once structure optimizer 160 obtains optimal choices for each layer of the task specific neural network, parameter optimizer 170 may retrain the optimal architecture on task $T_i$. In some embodiments, parameter optimizer 170 may retrain the "reuse" parameters either by fixing the parameter and keeping the parameter unchanged or tuning the parameter using regularization, such as $l_2$ regularization or more sophisticated regularization such as elastic weight consolidation. In some embodiments, when structure optimizer 160 selects to "reuse" a parameter at layer l, the $l_{th}$ layer may learn a very similar representation during the current task $T_i$, as it learned during one of the previous tasks. This may be an indication of a semantic similarity learned at layer l between the current and previous tasks.

In some embodiments, parameter optimizer 170 may retrain the "reuse" parameter by tuning the $l_{th}$ layer with some regularization. Tuning the parameters may be accomplished by slightly modifying the parameters within a pre-configured range. Tuning the parameters may also benefit the previous tasks or at least reduce catastrophic forgetting due to the semantic relationships.

In some embodiments, after parameter optimizer 170 retrains the optimal architecture on a current task $T_i$, parameter optimizer 170 may merge the newly created and tuned parameters in the layers, task specific adapters and classifier(s) in the task specific neural network with the maintained super network S. In this way, neural network S may be used for model inference and be basis for further architecture search on subsequent tasks. Subsequently, training module 150 may repeat the process on the next sequential task in tasks 140 until training module 150 trains neural network 130 on all tasks in tasks 140.

Figure 3:
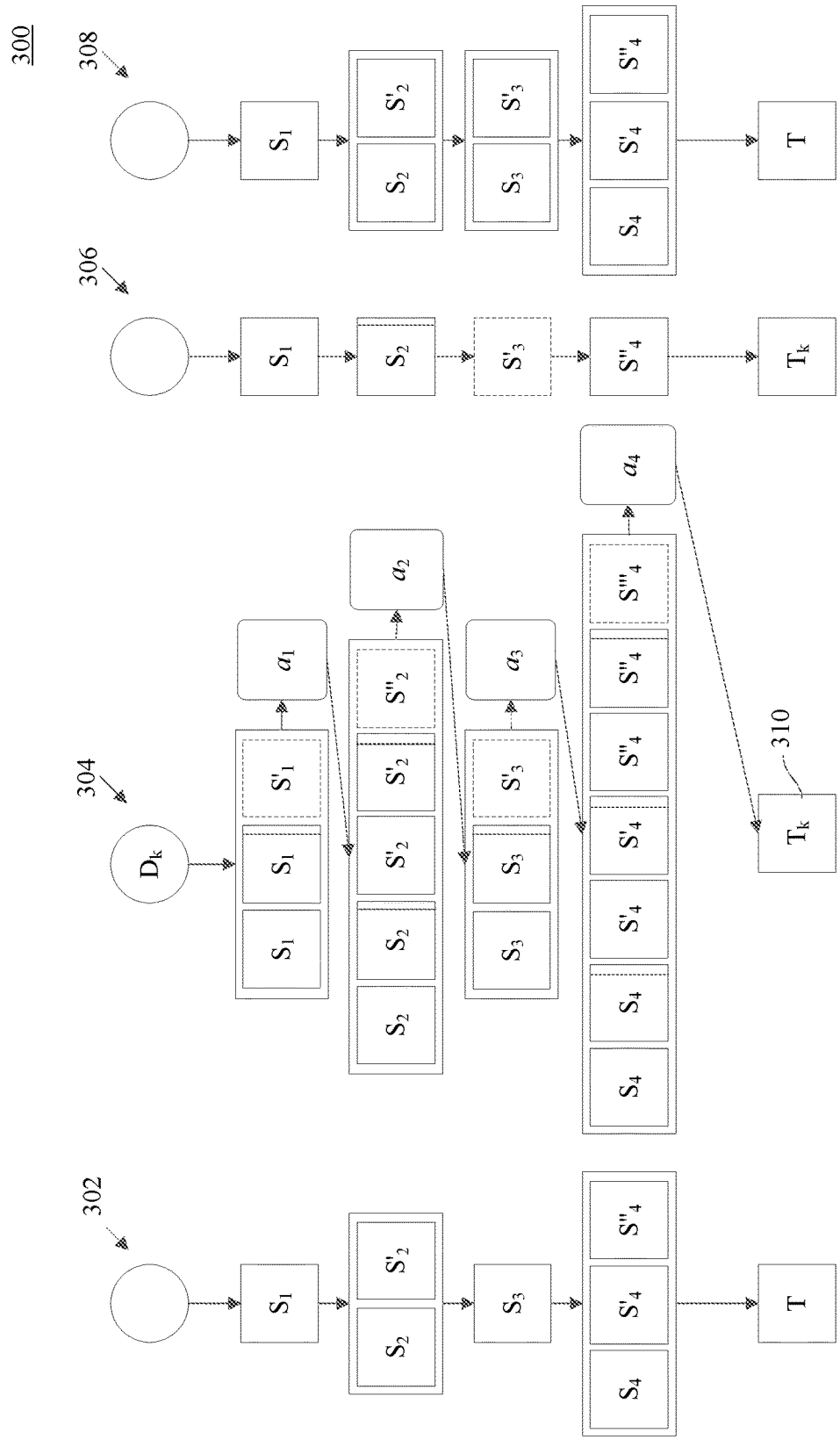
FIG. 3 is a block diagram for training a neural network on an individual task in a sequence of tasks, according to some embodiments.

FIG. 3 is a block diagram 300 of training a neural network on individual task $T_k$, according to some embodiments. FIG. 3 illustrates a current state of super network 302 that includes layers and parameters determined using one or more previous tasks. Super network 302 may be neural network 130, discussed above. As illustrated in FIG. 3, super network 302 may have one or more shareable layers, that include parameter $S_1$ in the first layer, parameters $S_2$ and $S'_2$ in the second layer, parameter $S_3$ in the third layer, and parameters $S_4$, $S'_4$, and $S''_4$ in the fourth layer. Additionally, super network 302 may have a task specific layer T. Task specific layer T may have layers that include parameters that correspond to the one or more previous tasks.

FIG. 3 also illustrates neural network 304. In some embodiments, structure optimizer 160 may generate neural network 304 by obtaining a copy of super network 302 and training the copy of super network 302 on task $T_k$. As part of the training, structure optimizer 160 may perform an architectural search on neural network 304 for task $T_k$. As discussed above, structure optimizer 160 may obtain choices that indicate whether to reuse parameters, add an adaptation to the parameter, or add a new parameter to each layer of neural network 304. Additionally, structure optimizer 160 may also add a task specific layer 310 to neural network 304 for task $T_k$.

As illustrated in FIG. 3, structure optimizer 160 may add a "reuse" choice, an "adaptation" choice, and/or a "new" choice to neural network 304 using "reuse," "adaptation," and/or "new" operators. For example, as illustrated in FIG. 3, structure optimizer 160 may add an adaptation to the parameter $S_1$ and generate a new parameter $S'_1$ in the first layer. In another embodiment, structure optimizer 160 may add an adaptation to the parameter $S_2$, add an adaptation for the parameter $S'_2$ and generate a new parameter $S''_2$ in the second layer. In another example, structure optimizer 160 may add an adaptation to the parameter $S_3$ and generate a new parameter $S'_3$ in the third layer. In another example, structure optimizer 160 may add an adaptation to the parameter $S_4$, add an adaptation to the parameter $S'_4$, add an adaptation to the parameter $S''_4$ and generate a new parameter $S'''_4$ in the fourth layer.

In some embodiments, when structure optimizer 160 may add a "reuse" choice, an "adaptation" choice, and a "new" choice to each layer, structure optimizer 160 may add a total of $2|S^l|+1$ choices. In further embodiments, structure optimizer 160 may obtain a set of continuous architecture weights $\alpha$ for each layer, shown as parameter $\alpha_1$ for the first layer, parameter $\alpha_2$ for the second layer, parameter $\alpha_3$ for the third layer, and parameter $\alpha_4$ for the fourth layer $S_4$.

Once structure optimizer 160 adds parameters for each layer of neural network 304 using "reuse," "adaptation," and "new" operators, structure optimizer 160 may determine the optimal parameters for neural network 304 for task $T_k$. To determine the optimal parameters, structure optimizer 160 may train neural network 304 using task $T_k$ to determine which parameters generate the largest architectural weight in each layer. For example, structure optimizer 160 may select an architecture for task $T_k$ that is illustrated as neural network 306 in FIG. 3 and includes parameter $S_1$ in the first layer, parameter $S_2$ with an adaptation in the second layer, the new parameter $S_3$ in the third layer and a reused parameter $S''_4$ in the fourth layer.

In some embodiments, once structure optimizer 160 determines neural network 306, parameter optimizer 170 may optimize the parameters in neural network 306 by retraining neural network 306 using the task $T_k$.

Once parameter optimizer 170 completes optimizing the parameters in neural network 306, parameter optimizer 170 may update super network 302 with the architecture and parameters of neural network 306, as shown by neural network 308. After parameter optimizer 170 updates super network 302 with the architecture and parameters in neural network 306, neural network 308 become the super network for task $T_{k+1}$ (not shown).

Figure 4:
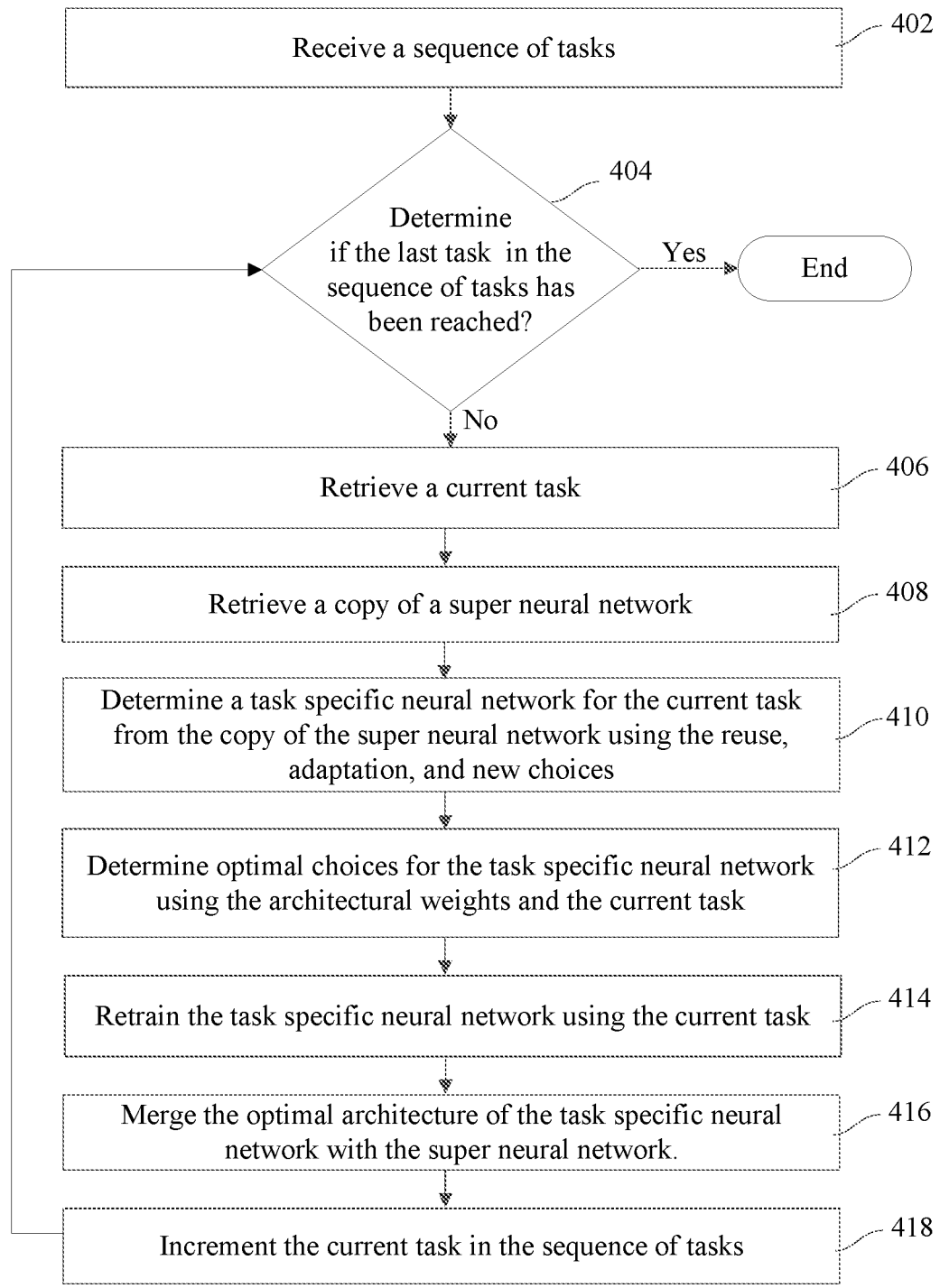
FIG. 4 is a simplified diagram of a method for training a neural network, according to some embodiments.

FIG. 4 is a simplified diagram of a method 400 for training a neural network, according to some embodiments. One or more of the processes 402-418 of method 400 may be implemented, at least in part, in the form of executable code stored on non-transitory, tangible, machine-readable media that when run by one or more processors may cause the one or more processors to perform one or more of the processes 402-418.

At process 402, a sequence of tasks is received. For example, training module 150 may receive tasks 140 from memory 120. As discussed above, training module 150 may train neural network 130 using tasks 140. As further discussed above, tasks 140 may be sequential tasks.

At process 404, a determination whether the last task in tasks 140 has been reached. For example, training module 150 may determine whether the last tasks in tasks 140 has been reached and used to train neural network 130. If the last task has been reached, the super network S becomes the trained neural network 130, and method 400 ends. If there are more tasks in tasks 140 that training module 150 may use to train neural network 130, method 400 proceeds to process 406.

At process 406, a current task is retrieved. For example, training module 150 may retrieve a current task in tasks 140. The current task may be a task that training module 150 may use to train neural network 130 in the sequence of tasks 140.

At process 408, a copy of a super network S is retrieved. As discussed above, a super network S may store the architecture that includes shareable layers, parameters included in the shareable layers, and task specific layers of previously trained tasks in tasks 140.

At process 410, a task specific neural network is determined. For example, structure optimizer 160 may determine an architecture for the task specific neural network for the current task by taking a copy of the super network retrieved in process 408 and adding the parameters from the "reuse," "adaptation," and "new" choices to the copy of the super network S at each layer.

At process 412, optimal parameters in the task specific neural network are determined. For example, structure optimizer 160 may determine which parameters in the task specific neural network maximize architectural weights for each layer. The parameter that maximizes the architectural weight at that layer is the optimal parameter for that layer.

At process 414, the optimal parameters in the task specific neural network are retrained. For example, parameter optimizer 170 optimizes the optimal parameters in the task specific neural network by retraining the parameters using the current task. As parameter optimizer 170 retrains the optimal parameters, parameter optimizer 170 may also tune the parameters that structure optimizer 160 identifies as the "reuse" parameters.

At process 416, the optimized parameters are merged into the super network. For example, parameter optimizer 170 may merge the adaptations to the existing parameters, the new parameters, and the tuned parameters into the super network S.

At process 418, the current task becomes the next task. For example, training module 150 may increment the current task, such that processes 404-416 may be repeated on the task following the current task in tasks 140.

In some embodiments, once training module 150 trains neural network 130, neural network 130 may be used to process multiple tasks that neural network 130 was trained to process without or with reduced catastrophic forgetting.

In some embodiments, neural network 130 trained using training module 150 may process multiple tasks without catastrophic forgetting and thus is an improvement over the conventional neural networks trained using other models. Table 1, below, demonstrates a table that includes ten known image classification tasks, such as tasks ImageNet ("ImNet"), C100, SVHN, UCF, OGlt, GTSR, DPed, VGG-Flower ("Flwr"), Aircraft ("Airc."), and DTD. The images in the ten tasks may be resized so that the lower edge may be 72 pixels. Further the ten tasks are across multiple domains and the dataset seizes are highly imbalanced. Table 1 also illustrates various neural network models, such as an Individual model, a Classifier model, an Adapter model, and the training module 150 that train the ten tasks. In the Individual model, each of the ImNet, C100, SVHN, UCF, OGlt, GTSR, DPed, Flwr, Airc., and DTD tasks is trained individually. Further, the weights in the Individual model are initialized randomly. In the Classifier model, the classifier in the last layer of the neural network may be tuned, while the former twenty file layers are transferred from the ImageNet pre-trained model and are kept fixed during training. In this case, each task may add a task specific classifier and batch normalization layers, thus keeping the size of the Classifier model small. In the Adapter model a 1×1 convolution layer is added next to each 3×3 convolution layer and the outputs of the 1×1 convolution layer and the 3×3 convolution layer may be passed to the next layer of the neural network. Because of the lightweight convolution layer, each task may add approximately ⅑ to the size of the whole model.

Neural network 130 that training module 150 may train using the ten tasks may be a 26-layer ResNet network that is described in "Deep Residual Learning for Image Recognition" which is incorporated herein by reference. In this case, neural network 130 may include three residual blocks with each output being 64, 128, and 256 channels. Each residual block may also contain four residual units, each of which consists of two convolutional layers with 3×3 kernels and a skip connection. At the end of each residual block, the feature resolution may be halved by average pooling. Further, when an adaptation choice is included in neural network 130, the adaptation may be a 1×1 convolution layer with channels equal to the current layer output channels that is added for the corresponding layer. The convolved results may be added back to the convolution output. During training, parameter optimizer 170 may also fix the parameters while the 1×1 layer is adjusted. When training module 150 trains neural network 130 on the ten tasks, training module 150 may train neural network 130 in a random sequence, except for the ImageNet being the first task. This is to make a fair comparison with the Individual, Classifier, and Adapter models that adapt the ImageNet pretrained model to the other nine tasks. However, in other embodiments, training module 150 may train neural network 130 using all ten tasks in a random sequence. As training module 150 trains neural network 130, the super network S is maintained as discussed above and newly created parameters and task-specific layers are stored in the super network S. Further, in neural network 130, the batch normalization layers may be treated as task specific layers, which means that each task has its own batch normalization layer(s). Further, in Table 1, training module 150 may fix the parameters during the retraining phase when a "reuse" choice is selected during the architectural search phase.

TABLE 1

| Model | ImNet | C100 | SVHN | UCF | OGII | GTSR | DPed | Flwr | Airc. | DTD | avg. | #params |
|---|---|---|---|---|---|---|---|---|---|---|---|---|
| Individual | 69.84 | 73.96 | 95.22 | 69.94 | 86.05 | 99.97 | 99.86 | 41.86 | 50.41 | 29.88 | 71.70 | 58.96 |
| Classifier | 69.84 | 77.07 | 93.12 | 62.37 | 79.93 | 99.68 | 98.92 | 65.88 | 36.41 | 48.20 | 73.14 | 6.68 |
| Adapter | 69.84 | 79.82 | 94.21 | 70.72 | 85.10 | 99.89 | 99.58 | 60.29 | 50.11 | 50.60 | 76.02 | 12.50 |
| Search (Ours) | 69.84 | 79.59 | 95.28 | 72.03 | 86.60 | 99.72 | 99.52 | 71.27 | 53.01 | 49.89 | 77.68 | 14.46 |

As illustrated in Table 1, neural network 130 trained as discussed above and designated as "Search (Ours)" generates best results in five out of nine tasks. Table 1 further illustrates that neural network 130 is effective for tasks that have a small data size, such as VGG-Flowers and Aircraft tasks, where neural network 130 outperforms other models by a large margin and has the largest average for correctly processing the ten tasks. As also illustrated above, the size of neural network 130 is relatively small, and is comparable to the Adaptor model.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a neural network, the system comprising:
   at least one memory including a training module;
   a processor coupled to the at least one memory; and
   the training module configured to:
   receive a plurality of sequential tasks and the neural network to be trained on the plurality of sequential tasks, wherein the neural network contains a plurality of sharable layers that are shared by the plurality of sequential tasks and a plurality of task-specific layers specific to at least one of the plurality of sequential tasks;
   for each task in the plurality of sequential tasks:
   generate a copy of the neural network that includes a plurality of layers from the neural network that is being trained;
   perform an architectural search on the plurality of layers in the copy of the neural network, wherein the architectural search identifies a plurality of candidate choices in at least one layer in the plurality of layers of the copy of the neural network, the plurality of candidate choices associated with a selection of choices for processing parameters in layers of a task specific neural network;
   generate the task specific neural network with parameters indicated by selected choices from the plurality of candidate choices, wherein the selected choices are selected from one or more of reuse choices, adapted choices, and new choices, wherein the reuse choices reuse same parameters from the copy of the neural network, the adapted choices add an additive function to one of the parameters from the copy of the neural network, and the new choices add a new parameter to the task specific neural network that is not in the neural network, wherein the new parameter is newly initialized and trained;
   associate parameters in the task specific neural network that correspond to the selected choices with architectural weights; retrain the parameters in the task specific neural network to identify a parameter from the parameters with a corresponding maximum architectural weight from the architectural weights; and update the neural network with the parameter; and wherein the neural network trained on the plurality of sequential tasks is a trained neural network.

2. The system of claim 1, wherein the processor is further configured to:
   perform a new task using the trained neural network.

3. The system of claim 1, wherein the training module is further configured to retrain the task specific neural network by fixing one of parameters in the parameters that were selected using the reuse choices.

4. The system of claim 1, wherein the training module is further configured to retrain the task specific neural network by tuning one of parameters in the parameters that were selected using the reuse choices.

5. A method for training a neural network, the method comprising:
   receiving a plurality of sequential tasks;
   receiving the neural network to be trained on the plurality of sequential tasks, wherein the neural network contains a plurality of sharable layers that are shared by the plurality of sequential tasks and a plurality of task-specific layers specific to at least one of the plurality of sequential tasks; and for each task in the plurality of sequential tasks:

generating a copy of the neural network that includes a plurality of layers from the neural network, the plurality of layers including the plurality of shareable and task-specific layers;

performing an architectural search on the plurality of layers in the copy of the neural network, wherein the architectural search identifies a plurality of candidate choices in at least one layer in the plurality of layers of the copy of the neural network, the plurality of candidate choices associated with a selection of choices for processing parameters in layers of a task specific neural network;

generating the task specific neural network with the parameters indicated by selected choices from the plurality of candidate choices, wherein the selected choices are selected from one or more of reuse choices, adapted choices, and new choices, wherein the reuse choices reuse same parameters from the copy of the neural network, the adapted choices add an additive function to one of the parameters from the copy of the neural network, and the new choices add a new parameter to the task specific neural network that is not in the neural network;

associating parameters in the task specific neural network that correspond to the selected choices with architectural weights; retraining parameters in the task specific neural network to identify a parameter from the parameters with a corresponding maximum architectural weight from the architectural weights; and updating the neural network with the parameter; and wherein the neural network trained on the plurality of sequential tasks is a trained neural network.

6. The method of claim 5, further comprising:

for each task in the plurality of sequential tasks:

generating a task specific layer in the task specific neural network; and updating the neural network with the task specific layer.

7. The method of claim 5, wherein the retraining further comprises:

fixing one of the parameters in the parameters that were selected using the reuse choices.

8. The method of claim 5, wherein the retraining further comprises:

tuning one of the parameters in the parameters that were selected using the reuse choices.

9. A non-transitory machine-readable medium having stored thereon machine-readable instructions executable to cause a machine to perform operations that train a neural network, the operations comprising:

receiving a plurality of sequential tasks;

receiving the neural network, the neural network to be trained on the plurality of sequential tasks, wherein the neural network contains a plurality of sharable layers that are shared by the plurality of sequential tasks and a plurality of task-specific layers specific to at least one of the plurality of sequential tasks; and for each task in the plurality of sequential tasks:

generating a copy of the neural network that includes a plurality of layers from the neural network that is being trained; performing an architectural search on the plurality of layers in the copy of the neural network, wherein the architectural search identifies a plurality of candidate choices in at least one layer in the plurality of layers of the copy of the neural network, the plurality of candidate choices associated with a selection of choices for processing parameters in layers of a task specific neural network;

generating the task specific neural network with the parameters indicated by selected choices from the plurality of candidate choices, wherein the selected choices are selected from one or more of reuse choices, adapted choices, and new choices, wherein the reuse choices reuse same parameters from the copy of the neural network, the adapted choices add an additive function to one of the parameters from the copy of the neural network, and the new choices add a new parameter to the task specific neural network that is not in the neural network; associating the parameters in the task specific neural network that correspond to the selected choices with architectural weights;

retraining the parameters in the task specific neural network to identify a parameter from the parameters with a corresponding maximum architectural weight from the architectural weights; and updating the neural network with the parameter; and wherein the neural network trained on the plurality of sequential tasks is a trained neural network.

10. The non-transitory machine-readable medium of claim 9, wherein the operations that retrain the parameters further comprise:

fixing one of the parameters in the parameters that were selected using the reuse choices.

11. The non-transitory machine-readable medium of claim 9, wherein the operations that retrain the parameters further comprise:

tuning one of the parameters in the parameters that were selected using the reuse choices.

12. The system of claim 1, wherein the architectural search utilizes a priority queue to limit a number of choices in the plurality of candidate choices.

13. The method of claim 5, wherein performing the architectural search further comprises limiting, using a priority queue, a number of choices in the plurality of candidate choices.

14. The non-transitory machine-readable medium of claim 9, wherein performing the architectural search further comprises limiting, using a priority queue, a number of choices in the plurality of candidate choices.

15. The system of claim 1, wherein the training module is further configured to initialize parameters in the plurality of sharable layers of the neural network with predetermined values.

16. The system of claim 1, wherein the training module is further configured to initialize parameters in the plurality of sharable layers of the neural network with random values.

17. The method of claim 5, further comprising initializing parameters in the plurality of sharable layers of the neural network with predetermined values.

18. The method of claim 5, further comprising initializing parameters in the plurality of sharable layers of the neural network with random values.

19. The non-transitory machine-readable medium of claim 9, wherein the operations further comprise:

initializing parameters in the plurality of sharable layers of the neural network with predetermined values.

20. The non-transitory machine-readable medium of claim 9, wherein the operations further comprise:

initializing parameters in the plurality of sharable layers of the neural network with random values.

* * * * *